PHOTON MODULATION IN SEMICONDUCTORS

Filed Nov. 18, 1952 2 Sheets-Sheet 1

INVENTOR.
KURT LEHOVEC
BY
Connolly and Hutz
HIS ATTORNEYS

PHOTON MODULATION IN SEMICONDUCTORS

Filed Nov. 18, 1952 2 Sheets-Sheet 2

INVENTOR.
KURT LEHOVEC
BY
Connolly and Hutz
HIS ATTORNEYS

United States Patent Office 2,776,367

Patented Jan. 1, 1957

2,776,367

PHOTON MODULATION IN SEMICONDUCTORS

Kurt Lehovec, Williamstown, Mass., assignor to the United States of America as represented by the Secretary of the Army Application November 18, 1952, Serial No. 321,253

10 Claims. (Cl. 250—7)

This invention relates to novel processes for producing semiconductor translators and methods of controlling such translators to selectively absorb or emit light quanta in accordance with the rate of carrier injection in said semiconductor. More particularly, this invention relates to semiconductor materials which may be prepared to include selective impurity induced regional distortions. These distortions may be attributable to donor, acceptor, and activator inclusions, and as evidenced by lattice defects, stacking disorders, and structural anomalies in the basal lattice planes. Specifically, these regional distortions are selectively controlled so that the carrier charges injected into the semiconductor may cause energy changes therein to either absorb or emit light quanta.

It has long been known that certain materials generically grouped as phosphors would produce light emission in the form of fluorescence or phosphorescence when subjected to external stimuli, such as electronic bombardment or exposure to light.

It has also been long known that some semiconductor materials, such as silicon carbide crystals would luminesce if a potential was applied across it. The light emission was not caused by heating, and the presence underlying the process was unknown until recently. The intensity of the emission, however, was so slight as to be of no practical application, and the phenomenon had been relegated to a minor role as a mere physical curiosity.

Semiconductor materials, such as silicon and germanium, have also been noted to luminesce, but in view of the relative closeness of the absorption edge of the semiconductor and the frequency of the free emission, the luminescence was extremely weak because of absorption within the bulk of the material.

All of these prior art devices, while useful in certain limited applications, have failed to provide an effective and efficient translator for modulating intelligence with a high degree of fidelity. Accordingly, the present invention has for its primary purpose the utilization and proper control of two types of interrelated but distinct phenomena incident to semiconductor materials to modify the same for intelligence translators and modulators in a manner heretofore not considered possible. In general, the present invention depends for its novel result upon the selective injection of carriers into semiconductor materials which have been prepared in a certain manner. In one form, the translating characteristic of the invention is obtained upon absorption of radiant energy in the form of light; while in a second form, it is obtained upon the emission of radiant energy in the form of light; and in each instance the control of the radiant energy will depend upon the carrier current in the semiconductor body.

One object of the instant invention is to provide a semi-conductor photomodulator which may modulate a light beam passing through the semiconductor by selectively controllable absorption. A further object is to provide a photo amplifying system of extremely minute size. Another object is the provision of a translating device composed of a semiconductor material which may emit light with high fidelity dependent upon an internal current flow composed of injected carriers. Other and distinct objects will become apparent from the description and claims which follow.

It is well known that the conductivity of an electronic semiconductor can be controlled by certain impurities or lattice defects, such as to be either n-type or p-type. Semiconductors have been made with regions of n-type conductivity and of p-type conductivity, bordering to each other with an interposed boundary or junction, commonly noted as an n-p-barrier between them. In some parts the electric charge or current is carried by electrons and is commonly denoted as n-type or excess conduction, while in other portions the electric current or charge is transmitted by holes (missing electrons) and is commonly denoted as p-type conduction. It is also known that if a voltage of proper polarity is applied across such a boundary, electrons may be driven from the n-part across the boundary and into the p-part and holes driven from the p-part across the boundary and into the n-part. This phenomenon corresponds to a simultaneous injection of minority carriers into each region tending to provide carrier balance or equilibrium.

If these electrons and holes are present simultaneously in particularly given locations within the semiconductor, the holes may function as traps for the electrons and both are annihilated, i. e. disappear as current or charge carriers producing a consequent change in the energy state of the semiconductor. Alternately if the semiconductor is prepared and operated in such manner that they do not recombine but are long lived and concentrated, the redistribution of elemental charges resulting also changes the energy state of the semiconductor. This change in energy state may be so controlled as to selectively absorb or emit light quanta according to the rate of carrier injection.

Photomodulation of an incident light beam results from the fact that the absorption characteristic of a semiconductor may be altered by the injection of charge carriers and is due to the absorption of the injected carriers proper or to an overall increase in absorption resulting from an increase in concentration of majority carriers brought about by the neutralization of the space charge of the injected carriers. The absorption of free carriers is responsible for the absorption in the region on the long wave side of the lattice absorption edge and has been correlated in this region with the concentration of carriers and particularly with respect to hole concentration (see 77 Phys. Rev. 727, 1950).

It is therefore possible to modify or modulate the absorption in a wave length region on the long wave side of the absorption edge by controlled carrier injection to bring about a corresponding regional change in the concentration of the carrier. This becomes particularly efficacious when the semiconductor is biased in the forward direction since such operation provides injection of carriers. Thus, an incident light beam of proper frequency and specified intensity may be directed into a semiconductor and therein selectively absorbed so that the beam emerging will be modulated according to the selective absorption induced in the semiconductor.

The theory of this phenomenon may be explained as follows:

The current in the forward direction over a p-n junction is due to injection of minority carriers (concentration $n(x)$). The minority carriers migrate into the bulk semiconductor by ($a$) diffusion and ($b$) under the influence of an electric field. The migration is terminated by recombination with majority carriers.

For a quantitative estimate of $n(x)$ we shall assume that diffusion current exceeds largely the field current of injected carriers. The condition of continuity takes then the simple form $$\frac{d^2n}{D_{dx}2}=-\frac{n}{t} \qquad (1)$$

($D=ykA/e$ diffusion constant of injected carriers, $y$=mobility, $k$=Boltzman constant, $A$=absolute temperature, $e$=elementary charge, $t$=life time of injected carriers.)

Integration gives $$n=n_0 \exp\left(-\frac{x}{\sqrt{Dt}}\right) \qquad (2)$$

where $n_0$ is the concentration of minority carriers immediately adjacent to the junction. The concentration $n_0$ can be expressed by the current I, using the equation $$I=HWDe\frac{dn}{dx}\Big|_{x=0}=HWn_0e\sqrt{\frac{D}{t}} \qquad (3)$$

($H$=height of the rectangular junction and $W$=width). Hence, $$n_0=\frac{I}{HWe}\sqrt{\frac{t}{D}} \qquad (4)$$

According to (2), $n_0$ decays by a factor $1/e=1/2.72$ at the distance $$L=\sqrt{Dt} \qquad (5)$$

With $t\approx100$ μsec. and $D\approx50$ cm.$^2$/sec., which appear to be values of reasonable order of magnitude for germanium and silicon of proper preparation, we obtain $L\approx0.07$ cm.

Assume a light beam of intensity per unit area J (expressed in quanta per cm.$^2$ per second) and of rectangular across section (height H, width X) incident on the semiconductor parallel to the junction and to the side of width W. The fraction (R) of the light beam is reflected and the intensity $$Q=JXH(1-R)\exp(-WT) \qquad (6)$$

emerges from the semiconductor; T can be modulated by the carrier injection.

The change of light intensity with current is linear for sufficiently small values of current. Then we may set $$T\approx T_0+\Delta T \qquad (7)$$

and $$Q=Q_0+\Delta Q \qquad (8)$$

and we obtain $$\Delta Q\approx JXH(1-R)\exp(-WT_0)W\Delta T \qquad (9)$$

Maximum value $(\Delta Q)m$ is obtained by choosing the width of the bar $$W=\frac{1}{T_0} \qquad (10)$$

$$(\Delta Q)m=\frac{JXH(1-R)}{2.72}\frac{\Delta T}{T_0} \qquad (11)$$

Since ΔT is proportional to $\Delta n_0^2$, we have $$\Delta T=\Delta n_0/p \qquad (12)$$

where $p$ is a constant $\sim10^{16}$cm.$^{-2}$ for silicon. Replace $n_0$ in (12) by using (4) and insert the value of ΔT so obtained into (11) to obtain $$(\Delta Q)m=\frac{JX(1-R)-I/e}{2.72\cdot p}\frac{t}{D} \qquad (13)$$

Since only light passing within a distance ~L from the junction will be modulated, one shall choose $X\approx L$.

Then from (13) and (5), the efficiency of light modulation may be calculated $$\frac{(\Delta Q)m}{\Delta I/e}=\frac{J(1-R)t}{2.72\cdot p} \qquad (14)$$

The numerical factor $(1-R)/2.72$ is of the order of 0.3. For $t\approx10^{-4}$ sec., and $p\sim10^{16}$cm.$^{-2}$, efficiencies larger than unity may be obtained for light intensities larger than 3 x $10^{20}$ quanta/cm.$^2$sec. (for light of near infrared about 20 watts/cm.$^2$).

After having discussed in some detail the change in absorption of a light beam incident into a semiconductor containing a p-n-barrier, I shall turn to the creation of light by the injection of carriers over a p-n-barrier. It has already been noted that in a region where electrons and holes are present simultaneously, annihilation of the electrons and holes takes place. In the annihilation process energy is disposed of either as heat or as radiation. The following part of the instant invention concerns means for accentuating the recombination of electrons and holes with light emission as well as the creation of conditions leading to the simultaneous presence of electrons and holes in the same region.

The accentuation of the recombination of electrons and holes under emission of light is done by inclusion of so-called activator-type impurities into the semiconductor close to the p-n-barrier. The activator types of impurities are selected from a group including manganese, silver, thallium, bismuth, copper, lead, europium, cerium, tin, samarium and zinc. These impurities induce emission centers in a manner analogous to that known for impurity activated phosphors.

This emission appears to be dependent upon the rate of recombination between holes and electrons corresponding to pair annihilation and therefore is directly proportional to pair production, i. e., the greater the number of electron-hole pairs produced in a divided and ununited state, the greater the pair annihilation subsequently resulting due to their recombination. Thus if a larger current is passed across the barrier junction more carriers of each type will be projected or injected over the barrier into the respective p and n areas, to increase the rate of reaction or pair annihilation and directly increase the emission intensity. Thus the light emission arises from the recombination of injected carriers, whereas the photomodulation discussed in the previous part of this disclosure arises from the absorption due to injected carriers. Light emission occurs at the termination of the life of injected carriers, whereas photomodulation occurs during the life of the injected carriers.

In practice, light emission or absorption due to the carrier injection may be obtained in various semiconductor materials including silicon-carbide, germanium, silicon and diamonds containing natural or accentuated p-n junctions in which the adjacent areas differ in the type of conductivity. The instant invention, however, is not limited to single crystals and may comprise materials which form solid solutions, for example, germanium and silicon or selenium and tellurium. In the case of the existence of mixed crystals in any composition, a transition from material A to material B within the single crystal may be achieved. These latter type p-n junctions may be conveniently referred to as "graded seal" junctions.

Another means of creating a high concentration of both holes and electrons in the same region is the following: a region of the semiconductor is distorted strongly by a large amount of impurities or by lattice defects such that the rate of recombination of electrons and holes (but not necessarily leading to light emission) is very high. It follows from well-known general considerations, that in such a region also the rate of creating of holes and electrons by thermal agitation is very high. The novel idea of this part of the instant invention consists in the application of a field in such a direction as to carry one or both of the types of carriers generated by thermal agitation in the distorted region discussed above into another region where recombination with the other type of carriers takes place under predominant light emission. Notice that in this type of light emitter no p-n-barrier is necessary. In short, light emission arises here from injection of minority carriers from a region of high rate of creation and of low relative probability of optical recombination into a region of low rate of creation and high relative probability of optical recombination.

Reference will now be made to the drawings in describing applications of the instant invention and in which.

Figure 1:
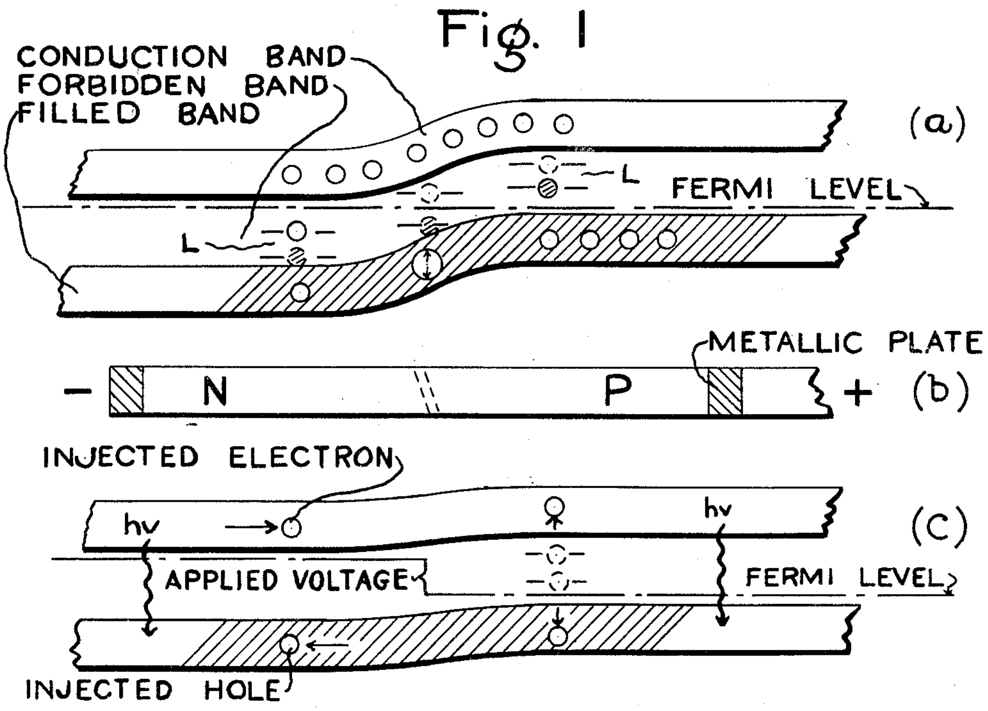
Fig. 1 is a sketch illustrating the energy band of a light source according to the invention.

Fig. 1 illustrates the electronic energy states considered present in a silicon-carbide light source operated according to the invention. The semiconductor is illustrated in diagram (*b*) of the figure and includes the usual p and n conductive region joined by the usual barrier junction. The ends of the crystal have ohmic terminals by which a potential is applied across the n-p barrier in the forward direction. Diagram (*a*) illustrates the energy state of the crystal when no potential is applied. The system in addition to the usual charge carriers comprising holes and electrons includes additional auxiliary energy states, indicated by the letter (L) in the figure, occurring by reason of the inclusion of the impurity activators previously mentioned. In the case of silicon-carbide, diamonds and other semiconductors the centers L may occur naturally through stacking disorders and structural anomalies in the atomic planes.

Diagram (*c*) of Fig. 1 illustrates the action when a potential is applied across the n-p barrier to inject charge carriers to respective sides thereof as previously described. As shown the holes and electrons are moved under the influence of the field to recombine in regions of high optical probability. Although Fig. 1 has been described with reference to silicon-carbide only and its luminescence action, it will be understood that a similar analogy is applicable to the operation of the other semiconductors mentioned.

Figure 2:
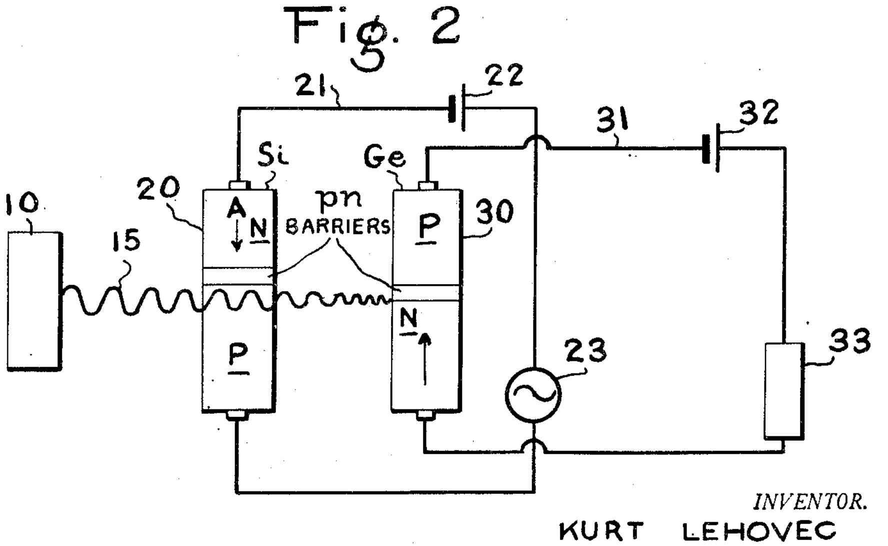
Fig. 2 is a schematic view of a photoamplifier according to the invention.

Reference will now be made to Fig. 2 of the drawings in describing a specific application of one form of the invention.

As shown in Fig. 2, 10 represents a light source which may consist of any conventional type having the desired spectrum, or may comprise a semiconductor source as heretofore described. Adjacent the light source 10 are provided two separate semiconductive members 20 and 30, respectively. The semiconductor 20 constitutes a photomodulator and may be of a semiconductor material such as silicon prepared in the usual manner of rectifiers and transistors and having an optical absorption edge in the region of 1.1 microns. This semiconductor is connected in an energizing circuit 21 consisting of a biasing source 22 and a superposed signal generator 23. The modulator 20 is biased in the forward direction such that minority carriers are injected across the p-n junction in the direction of the arrow A. The potential of source 22 may vary between 0.1 and 20 volts, while that of the signal source 23 may be of millivolt value.

The second semiconductor 30 is positioned in alignment with the source 10 and photomodulator 20 and comprises a material having a natural optical absorption edge in the region of 1.5 microns, such as germanium. This semiconductor constitutes a phototransistor or recorder for receiving incident light beams and transforming the same into electrical intelligence, and may be prepared in the conventional manner for transistors. For this purpose a circuit 31 is connected across the transistor 30 and includes a biasing source 32 and a load 33 across which the output signal may be developed. As shown, the source 32 biases the transistor in a reverse or blocking direction with current flow being in the direction of the arrow B.

The source 10 is so chosen that the light beam 15 will have a wave length in the region of 1.5 microns which is longer than the absorption edge of the photomodulator 20 and somewhat shorter than the absorption edge of the phototransistor edge 30. By reason of the phenomenon previously described, the intensity of the light beam emerging from the photomodulator will depend upon the absorption within the semiconductor 20 due to the injected carriers A and will correspondingly depend upon the signal 23 governing the injection thereof. The modulated light beam upon emerging from the photomodulator 20 is then directed upon the phototransistor 30 with an intensity varying in accordance with the modulation signal input 23. This photon intelligence is then converted by the transistor 30 into free carriers to vary the output across load 33 in a manner well understood in the art. By the above arrangement, one semiconductor 20 is constructed so that it will absorb only a predeterminable variable fraction of an incident light beam, while the second semiconductor 30 is so constructed that it will absorb substantially all of the incident light beam and convert it into free carriers. In practice the beam 15 should be confined within a distance of .07 cm., from the barrier edge for best results. Conventional gratings may be used for this purpose.

Amplification is thus achieved, since the intensity of the light beam 15 may be chosen to be very high, preferably about 20 watts/cm.$^2$, and since the light quanta transformed into current within transistor 30 produces current amplification in accordance with known procedures, see for example U. S. Letters Patent 2,402,662 to Ohl. Further, the ratio of the impedances of the semiconductor 20, which is biased in the forward direction, and the semiconductor 30, which is biased in the blocking direction, is very low and a low impedance signal may therefore be transformed into a high impedance signal.

It is also possible to provide multiple modulation of the source light beam by providing several photomodulators in series and having diverse signal generators whereby plural signals may be mixed. If desired, a focusing lens or grating may be interposed between units 20 and 30. Further, the transistor 30 may be replaced by a photoemissive cell, a photoconductive cell, or a light sensitive recording medium such as photographic film.

Figure 3:
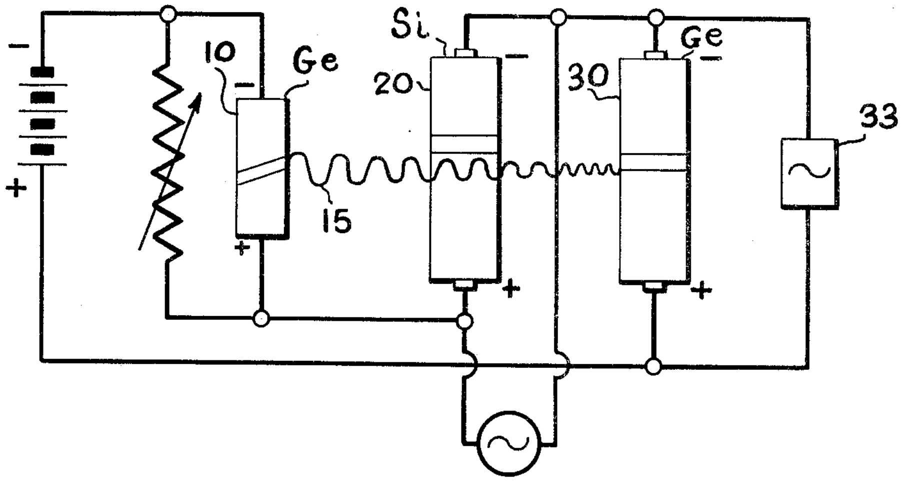
Fig. 3 is a modification according to Fig. 1.

A particularly efficacious arrangement is that illustrated in Fig. 3 in which the light source 10 is a germanium semiconductor prepared as a luminescent emitter, as set forth infra, and having an absorption edge at about 1.5 microns with luminescence at about 1.5 to 1.8 microns. The photomodulator 20 may be a silicon semiconductor with an absorption edge at about 1.1 microns and the phototransistor 30 may be a second germanium semiconductor with an absorption edge at about 1.5 microns.

The arrangement illustrated in Fig. 3 exemplifies the advantage of minute size inherent in the instant invention. As shown, all elements, source 10, modulator 20 and receiver 30, are connected in series circuit with a single power source B. A variable resistor R is connected in parallel across the light source 10 and may be varied to regulate the intensity of the emitted light quanta. The light beam 15 is directed upon the modulator 20, modulated and subsequently passed to the transistor 30 as previously described. The modulation signal may be connected directly across 20 as shown. The modulated signal converted into charge carriers in unit 30 may be detected across an output load 33. The formation of the semiconductor materials such as silicon or germanium for the photomodulator and phototransistor may be accomplished in the conventional manner and may include the use of donor and/or acceptor impurity traces; e. g. antimony, arsenic, phosphorus and nitrogen may be used for producing n-type conductivity in silicon and germanium; while gallium, indium, aluminum and boron may be used for producing p-type conductivity in germanium and silicon.

Reference will now be made to the form of the invention in which the production and annihilation of charge carriers results in the emission of light from a semiconductor.

Silicon-carbide crystals may be prepared to be luminescent by means of the usual pile growth system conventionally employed in commercial production of silicon-carbide, wherein mixtures of quartz and carbon are heated to unite and form silicon-carbide. To prepare luminescent crystals, the original pile mixture growth may be changed so that a n-type impurity, such as arsenic, may be included in the crystal, as by having traces of an arsenic compound placed in the original mixture. In addition, the activator impurities may be introduced into the pile at the same time. Thereafter the crystal is permitted to grow in the usual manner and at a predetermined stage may be removed and placed in a vacuum chamber and locally melted as by means of electron bombardment. Traces of a p-type impurity such as boron may be introduced into the melted areas and the crystal allowed to cool.

The activator impurities which have been found suitable for controlling luminescence may consist of one or more minute impurities, having a percentage ratio with respect to the semiconductor of between 0.001 and 5.0 percent, selected from the group consisting of silver, lead, manganese, bismuth, thallium, tin, copper, zinc, alloys of the preceding metals, and the rare earth metals notably cerium, europium and samarium.

The type of final product is bluish, greenish or pale yellow in color depending on the impurity and activator present and their concentrations. A surface oxide film may be removed by conventional means.

Subsequently low ohmic contacts are made at opposite ends of the crystal, one to the area which has not been melted and a second to the melted portion. These contacts may be made for example, by first binding zirconium to the crystal and then soldering or plating to the zirconium. Other methods of preparing low ohmic connections are described in U. S. Letters Patent 2,569,347, 2,502,488 and 2,402,663.

Figure 4:
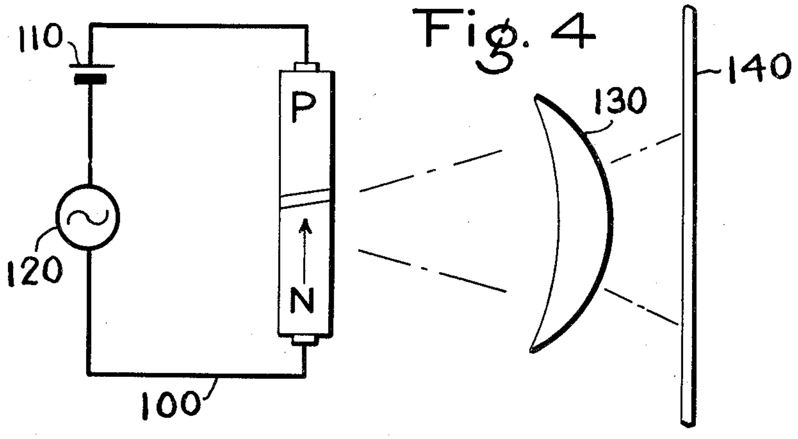
Fig. 4 is a schematic view of a sound recording system according to the invention.

A silicon carbide semiconductor prepared by the above described procedure, and having manganese as an activator, may be connected in a control circuit 100 as illustrated in Fig. 4. A biasing source 110 is provided in the circuit and connected to bias the crystal in a forward direction at a potential of 20 volts. A signal source 120 is also included in the control circuit 100 to superimpose a varying signal. A lens 130 is positioned in front of the crystal in such manner as to focus the emitted radiant energy upon a moving photographic film 140.

With this arrangement a wide band luminescent spectral emission, having a peak at approximately .55 micron and an intensity varying up to 1 watt/$cm.^2$ was observed to emanate from the silicon carbide. The emission was projected through the lens 130 onto the film 140 to selectively expose portions of the moving film in accordance with variations in the luminescent intensity provided by signal variations in source 120. This variation is substantially linear with the signal.

It was noted that the spectral distribution of the luminescent emission changed only slightly with current density and that upon reversal of the biasing, no emission occurred. Further, the spectral distribution was practically independent of applied field strength. It will thus be appreciated that the characteristics of the instant luminescent semiconductor substantially deviates from those known for the prior art type phosphors in which the luminescent spectrum was dependent upon frequency, field strength and current density.

A further advantage of the instant light source is the fact that even with weak potentials across the barrier junction, separate luminescent piplike emissions are easily recognizable at high frequencies even in excess of 200,000 cyles/sec. The device is thus eminently suitable for sound reproduction and recording applications as above noted.

The silicon-carbide source may be operated with no bias and in fact luminesceses with a potential difference of only three volts in the forward direction. It is also possible to operate the device with a potential at or below such minimum in order that very weak signal currents may be particularly effective to produce easily detectable changes in the relative intensities of the emission.

The device is unusual in that it is substantially opaque to heat and has an extremely simple construction, high stability and long life.

Suitable silicon-carbide light sources may also be prepared by a vapor condensation process in which silicon tetrafluoride and hydrogen are introduced into a vacuum chamber over a heated carbon filament in the presence of a hydrogen carbon arc mounted in close proximity to the film. Variations in the content of the silicon tetrafluoride and the temperature of the carbon filament produce predeterminable semiconductor structures. In some instances it may be advisable to combine toluene with silicon terafluoride in ratios between 2 to 1 and 10 to 1 to produce clear yellow crystals having a major portion thereof of n-type conductivity. Selected acceptor and donor impurities may then be introduced by local melting as previously described. Activators may also be incorporated in this manner, or alternatively, may be applied to the carbon filament prior to contacting it with the vapors.

In the case of germanium or silicon the preparation of the crystal growth may be in accordance with the prior art procedures disclosed by the patents to Scaff, No. 2,402,582, Ohl, No. 2,402,663 and Shockley, No. 2,569,347, with the added inclusion therein of significant activator impurities as previously noted. With the latter light sources, however, the applied potential across the barrier may be even less to produce an equivalent intensity, but the light emission occurs at infrared wave lengths.

A new type of luminescent semiconductor may also be prepared with a graded seal junction as indicated previously. It is well known that the spectral region of the strongest barrier photoeffect coincides with the long wave length absorption edge of the semiconductor material. If the wave length of the absorption edge on one side of the barrier differs from the wave length on the other side, one region will be transparent in a spectral distribution where the other region may have its maximum photosensitivity. Thus, if a transistor semiconductor is constructed of an n-type conductivity with one material and p-type conductivity with a second material, it may produce a large area junction which may be termed a "graded seal" having a medial absorption edge characteristic differing from those of the basic materials. Thus, light emissions in a region of one side of the barrier will lie outside of the absorption edge on the other side of the junction.

A suitable method for preparing the graded seal junction comprises the deposition of one material from the vapor phase, onto a heated substrate of the second material. For example, silicon crystals may be heated to a point below evaporation in a vacuum chamber. Thereafter germanium may be evaporated onto the heated silicon crystal. The evaporation may be obtained through various well-known processes, e. g. evaporation of germanium from a carbon crucible heated by radio frequency waves. Acceptor and donor impurities may be subsequently incorporated as by local melting through electron bombardment. Other semiconductors may be similarly prepared. As for example, tellurium may be evaporated upon heated selenium crystals to form a graded seal junction by a similar process.

Another more convenient method for preparing the graded seal junction is by fusing material A to material B at temperatures above the melting point of A, but below the melting point of B and subsequently slow cooling. This process corresponds to the well-known induced seed processes.

Among the advantages inherent in a graded seal junction type semiconductor is the fact that it may be used interchangeably for photo absorption and photoemission purposes. One material, A, of the graded seal junction, will be transparent for light of wave lengths which give rise to photoconductivity or photovoltaic effect in the other material, B, of the graded seal junction. This is a distinct improvement over conventional phototransistors, made from one material only, where light which causes a photoeffect in the p-n-barrier cannot penetrate toward the barrier without heavy absorption losses resulting from absorption in the bulk semiconductor. Similarly, light emitted in material B due to recombination of electrons and holes will not be absorbed in material A of the graded seal junction on its way out of the crystal.

Figure 5:
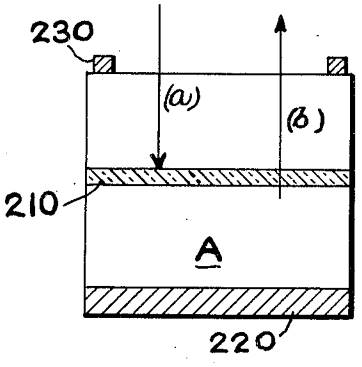
Figs. 5 and 6 illustrate further modifications of the invention.

An example of such type graded seal junction transistor is illustrated in Fig. 5 of the drawings. As shown, this unit consists of a unitary crystalline assembly 200 comprising a first crystalline matrix portion A joined to a second distinct crystalline matrix portion B by an intermediate graded seal n-p junction area 210. A base electrode 220 formed of a conductive material is bonded or united to the underside of the crystalline area A by any conventional process. A second electrode consisting of a conductive ring 230 is positioned at the front of the matrix portion B and functions with electrode 220 to connect the transistor element in circuit with an energizing power source. The materials of which the sections A and B are constructed are normally chosen to be distinct and may consist of silicon as the matrix portion B and germanium as the matrix portion A or alternatively may consist of selenium as the matrix portion B and tellurium as the matrix portion A. In either event the unit will function interchangeably as a light absorbing photovoltaic cell having a light incident produced voltage variation proportional to the quanta of incident light energy. Alternatively, the device may be operated as a light source in the manner previously described, in which case one portion of the crystalline matrix functions as a luminescent semiconductor while the second portion is transparent to the light emitted by the first. These conditions are respectively indicated in the figure by labels on the arrowheads denoted as *a* and *b*.

This is a distinct improvement over conventional silicon or germanium transistors which have been noted to produce slight luminescence under similar conditions, since in the instant case the emitted light will not have wave lengths close to the absorption edge of the opposite region, and substantially all of the emitted light will be passed through the non-emitting region without loss.

Figure 6:
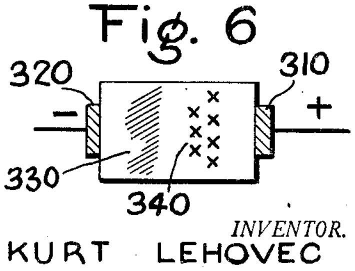

A further form of the invention may employ semiconductor material having a crystal fault region constituting a distortion within the crystalline matrix. The crystal faults may be either natural or may consist of suitable impurities such as iron, nickel or cobalt. The example of this form of the invention is illustrated in Fig. 6 and includes a natural fault area 330 intermediate conductive contact elements 310 and 320 united at opposite end sections of the matrix. A plurality of regions having a very short average carrier charge lifetime are provided at region 340 within the crystalline matrix by introducing selected impurity activators, as explained previously, into the crystalline matrix. With this construction the region of distortion or crystal fault functions as a region of high rate of minority charge creation and low relative probability of optical recombination, while the region 340 functions as one having a high optical probability of recombination and low rate of minority charge carrier creation. By this innovation it is therefore possible to apply a field across the semiconductor matrix in the manner indicated to sweep the minority charge carriers created in the region of distortion over into the region of high relative probability of optical recombination induced by the presence of the selected activator impurity or impurities to cause light emission due to the recombination of the minority carriers with the majority carriers. Diamonds are an excellent example of this type semiconductor light source.

An alternative form of the invention according to Fig. 1 may employ a silicon-carbide source 10 prepared as previously described to have a peaked emissive luminescence in the near ultraviolet region, as by an included impurity of thallium between .05 and 1.5% and operated in the manner described with respects to Fig. 3; a diamond photon-modulator 20 prepared or selected to have an absorption edge in the region of 0.3–0.4 micron; and a silicon-carbide phototransistor 30, prepared in the manner previously described. A particular useful combination will consist of a source 10 and receiver or recorder 30 made from similar valence crystal semiconductors with a different type valence crystal modulator, i. e., germanium-silicon-germanium.

The silicon-carbide light semiconductor is also essentially effective as an all band light source when prepared with trace impurities of plural activators; as for example, thallium, silver, manganese, copper, lead and samarium. However, in this form of the invention the semiconductor should be biased in the reverse direction with a potential of 3–5 volts, and the signal voltage adapted to vary between 1 and 40 volts. In this case the luminescence will be spectrally responsive to the impressed voltage and will vary through bands of orange, yellow, green, blue and violet with the signal voltage. It is therefore possible to use a color sensitive emulsion on the film 140 of Fig. 4 to record distinct color signals proportional to the signal impressed on source 120.

This embodiment is eminently suitable for translating direct audible signals, as from a microphone, which may be coupled to the signal circuit in the conventional manner, as by a transformer. If desired, the bias may be eliminated and the unit operated with a stepped-up audio signal directly.

It will be obvious that although described with reference to single barriers, all forms of the invention may include plural n-p barriers.

It will further be apparent that the invention is not limited to the specific semiconductor materials used in the previous examples, and may be followed in other known crystalline semiconductors which have a region of lattice distortion or fault or an internal n-p barrier (natural or impurity induced).

As many apparently widely different embodiments of this invention may be made without departing from the spirit and scope hereof, it is to be understood that the invention is not limited to the specific embodiments hereof, except as defined in the appended claims.

What is claimed is:

1. A photomodulator comprising a unitary crystalline matrix including substantial amounts of germanium and silicon separated by a continuous n-p barrier.

2. In a photon-modulation system, a first section comprising an emissive source of light quanta, a second section operatively connected with said first section and including a structure for modulating said light quanta, said sections comprising a semiconductor translator having internal n-p barriers, one of said sections comprising a silicon-germanium semiconductor, and means for applying a unidirectional biasing field across said n-p barriers.

3. A unitary crystalline semiconductor light source, comprising two different semiconductor materials integrally connected by a graded junction, one semiconductor being n-type and the other p-type, and means for applying a potential across the unitary semiconductor in the forward direction of the n-p junction, said materials being germanium and silicon.

4. A unitary crystalline phototransistor comprising two different semiconductor materials integrally connected by a graded junction, one semiconductor being n-type, and the other p-type, and means for applying a potential across the unitary semiconductor in the blocking direction, said materials being germanium and silicon.

5. A unitary crystalline photovoltaic cell comprising two different semiconductor materials integrally connected by a graded junction, one semiconductor being n-type, the other p-type, an electrode on the p-type semiconductor, a second electrode on the n-type semiconductor, and means for applying a potential across the unitary semiconductor, said materials being germanium and silicon.

6. A photon transducer comprising a unitary crystalline matrix including substantial amounts of germanium and silicon separated by a continuous n-p barrier.

7. In a photon-modulation system, a first section comprising an emissive source of light quanta, a second section operatively connected with said first section and including structure for modulating said source light quanta, said sections comprising semiconductor translators having internal n-p barriers, means for applying a unidirectional biasing field across said n-p barriers, at least one of said translators comprising two materials having different long wave light absorption edges, said materials respectively containing n and p inducting impurities, said barrier being an internal n-p graded junction between said materials, and wherein said materials are germanium and silicon.

8. A unitary crystalline semiconductor light source, comprising two different semiconductor materials integrally connected by a graded junction, one semiconductor being n-type, the other p-type, and means for applying a potential across the unitary semiconductor in the forward direction of the n-p junction, said materials respectively having different long wave light absorption edges, said materials respectively containing n and p inducing impurities, and wherein said materials are germanium and silicon.

9. A unitary crystalline phototransistor comprising two different semiconductor materials integrally connected by a graded junction, one semiconductor being n-type, the other p-type, means for applying a potential across the unitary semiconductor in the blocking direction, said materials respectively having different long wave light absorption edges, said materials respectively containing n and p inducing impurities, and wherein said materials are germanium and silicon.

10. A unitary crystalline photovoltaic cell comprising two different semiconductor materials integrally connected by a graded junction, one semiconductor being n-type, the other p-type, an electrode on the p-type semiconductor, a second electrode on the n-type semiconductor, means for applying a potential across the unitary semiconductor, said materials respectively having different long wave light absorption edges, said materials respectively containing n and p inducing impurities, and wherein said materials are germanium and silicon.

References Cited in the file of this patent

UNITED STATES PATENTS

| | | |
|---|---|---|
| 1,629,727 | Murray | May 24, 1927 |
| 2,254,957 | Bay et al. | Sept. 2, 1941 |
| 2,524,033 | Bardeen | Oct. 3, 1950 |
| 2,570,978 | Pfann | Oct. 9, 1951 |
| 2,600,997 | Lark-Horovitz et al. | June 17, 1952 |
| 2,649,507 | Dressler et al. | Aug. 18, 1953 |
| 2,673,948 | Matare et al. | Mar. 30, 1954 |
| 2,678,400 | McKay | May 11, 1954 |
| 2,683,794 | Briggs | July 13, 1954 |
| 2,692,950 | Wallace | Oct. 26, 1954 |
| 2,697,189 | Stelmak | Dec. 14, 1954 |

OTHER REFERENCES

Shive: "The Transistor," pp. 116–121, published by Bell Tel. Labs., New York, December 4, 1951.